United States Patent
McFarland

(10) Patent No.: US 9,814,244 B1
(45) Date of Patent: Nov. 14, 2017

(54) OVEN FORMING ASSEMBLY FOR PROOFING AND COOKING CORRUGATED DOUGH CRUSTS

(71) Applicant: Kirt McFarland, Mesa, AZ (US)

(72) Inventor: Kirt McFarland, Mesa, AZ (US)

(*) Notice: Subject to any disclaimer, the term of this patent is extended or adjusted under 35 U.S.C. 154(b) by 94 days.

(21) Appl. No.: 14/510,293

(22) Filed: Oct. 9, 2014

(51) Int. Cl.
    *A22C 7/00* (2006.01)
    *A21B 1/42* (2006.01)
    *A21D 13/00* (2017.01)

(52) U.S. Cl.
    CPC ............ *A21B 1/42* (2013.01); *A21D 13/0067* (2013.01)

(58) Field of Classification Search
    CPC ................................ A21D 13/007; A21D 8/06
    USPC ......... 99/324, 348, 352, 353, 360, 362, 373, 99/386, 404, 420, 426, 443 R, 44, 3 C; 426/89, 93, 94, 128, 144, 391, 496, 503, 426/512, 516, 517, 518, 531, 549, 556, 426/665
    See application file for complete search history.

(56) References Cited

U.S. PATENT DOCUMENTS

| | | | |
|---|---|---|---|
| 3,111,913 A * | 11/1963 | Mladek | ..................... A21C 3/00 165/120 |
| 4,111,624 A | 9/1978 | Hanson | |
| 4,357,862 A * | 11/1982 | Anstett | ..................... A21B 5/08 426/438 |
| 4,876,934 A | 10/1989 | Fagan et al. | |
| 5,330,344 A * | 7/1994 | Konig | ...................... A21C 3/06 425/321 |
| 5,417,150 A | 5/1995 | Kordic | |
| 5,440,974 A | 8/1995 | Ueno et al. | |
| 5,538,744 A | 7/1996 | Miller et al. | |
| 5,614,237 A | 3/1997 | Clow et al. | |
| 5,676,790 A * | 10/1997 | Burrows | ............... B31F 1/2831 156/210 |
| 5,893,321 A * | 4/1999 | Capetta | ..................... A21C 3/06 425/321 |
| 5,906,764 A * | 5/1999 | Suzuki | ..................... A21B 2/00 219/700 |
| 5,935,629 A | 8/1999 | Martin | |
| 6,280,783 B1 | 8/2001 | Blaschke et al. | |
| 6,398,539 B1 | 6/2002 | Lawrence | |
| 6,783,782 B1 | 8/2004 | Larsen et al. | |
| 6,953,596 B2 | 10/2005 | Maniak et al. | |
| 7,316,556 B2 | 1/2008 | Maniak et al. | |

(Continued)

*Primary Examiner* — Dana Ross
*Assistant Examiner* — Joseph Iskra
(74) *Attorney, Agent, or Firm* — Booth Udall Fuller, PLC

(57) ABSTRACT

A system, oven forming assembly, and method for proofing and cooking corrugated dough crusts are disclosed. The system may include: a forming assembly including at least one parallel cylinder separated by at least one parallel space; and at least one base opposing the at least one parallel cylinder. An oven forming assembly may include: an oven including a conveyor; and a forming assembly opposite the conveyor including a plurality of parallel cylinders and spaces in an alternating series. A method may include: positioning at least one dough piece in contact with a conveyor and with an opposing forming assembly; moving the at least one dough piece on the conveyor under the opposing forming assembly into an oven proofing the dough piece; and moving the at least one proofed dough piece on the conveyor under the opposing forming assembly through the oven at least partially baking the proofed dough piece.

14 Claims, 14 Drawing Sheets

(56) References Cited

U.S. PATENT DOCUMENTS

| | | | | |
|---|---|---|---|---|
| 7,914,834 | B2 * | 3/2011 | Fu | A21C 11/04 425/299 |
| 8,563,064 | B1 * | 10/2013 | McFarland | A21D 8/06 426/144 |
| 2004/0083902 | A1 | 5/2004 | Gaskill et al. | |
| 2004/0151807 | A1 | 8/2004 | Damsgard | |
| 2004/0175453 | A1 | 9/2004 | Baeten et al. | |
| 2007/0184161 | A1 * | 8/2007 | McDonnell | A21C 3/02 426/502 |
| 2007/0275143 | A1 * | 11/2007 | Hoskins | A21C 11/08 426/496 |
| 2008/0245359 | A1 * | 10/2008 | Williamson | A21B 1/26 126/39 C |
| 2009/0181135 | A1 | 7/2009 | Domingues et al. | |
| 2009/0208613 | A1 * | 8/2009 | Waller | B65D 81/3407 426/106 |

\* cited by examiner

OVEN FORMING ASSEMBLY FOR PROOFING AND COOKING CORRUGATED DOUGH CRUSTS

CROSS REFERENCE TO RELATED APPLICATIONS

This application is a continuation in part application of the earlier U.S. Utility Patent Application to Kirt McFarland entitled "Roller Grill Retaining System," application serial number 140059789, filed Oct. 22, 2013, now pending, which is a continuation in part application of the earlier U.S. Utility Patent Application to Kirt McFarland entitled "Corrugated Crust," application Ser. No. 13/014,710, filed Jan. 26, 2011, now U.S. Pat. No. 8,563,064, the disclosures of all of which being hereby incorporated entirely herein by reference.

BACKGROUND

Technical Field

This document relates to a system, an oven forming assembly, and a method for proofing and cooking corrugated dough crusts.

Background

Roller grills exist and are common in, but not limited to, self-serve locations such as convenient stores because they can provide a flexible work environment with the capability to serve from both sides and can cook items in approximately 10-15 minutes. The items can then remain rolling on the roller grill and be picked up by a consumer without having to wait. Some roller grills feature, for example, stainless steel rollers and a body, one or more separate on/off switches to operate front rollers and/or rear rollers and one or more separate variable heat controls. However, current roller grills are limited in the food items they can cook and/or reheat, namely cylindrical food items such as hot dogs, burritos, egg rolls, corn dogs, rolled tacos, and the like, positioned between rollers so that they do not "roll" off the end of the grill, but roll in place.

SUMMARY

Aspects of this document relate to a system, an oven forming assembly, and a method for proofing and cooking corrugated dough crusts. These aspects may comprise, and implementations may include, one or more or all of the components and steps set forth in the appended CLAIMS, which are hereby incorporated by reference.

In one aspect, a system for proofing and cooking corrugated dough crusts may include: a forming assembly comprising at least one parallel cylinder separated by at least one parallel space; and at least one base opposing the at least one parallel cylinder.

Particular implementations may include one or more or all of the following.

The at least one base may be a conveyor.

The forming assembly may include a plurality of parallel cylinders and spaces in an alternating series. The forming assembly may be moveable in a direction opposite that of the conveyor. The plurality of parallel cylinders may be a plurality of parallel tubes.

The at least one parallel cylinder may be at least one parallel tube.

The system may further include at least one corrugated dough crust in between the at least one parallel cylinder and the at least one base. The at least one corrugated dough crust may include: a top surface in contact with the at least one base; and a bottom surface in contact with the at least one parallel cylinder, the bottom surface opposing the top surface and defining one of: at least two parallel grooves formed adjacent the at least one parallel cylinder separated by at least one parallel ridge extending in a space adjacent the at least one parallel cylinder; at least two parallel ridges extending in spaces adjacent the at least one parallel cylinder separated by at least one parallel groove formed adjacent the at least one parallel cylinder; and at least one parallel ridge extending in a space adjacent the at least one parallel cylinder.

Spacing between the parallel grooves may be about one inch to about one and three-quarters of an inch.

The parallel grooves may extend about one quarter to about one half the way to the top surface of the crust.

In another aspect an oven forming assembly for proofing and cooking corrugated dough crusts is disclosed that may include: an oven comprising a conveyor; and a forming assembly opposite the conveyor comprising a plurality of parallel cylinders and spaces in an alternating series.

Particular implementations may include one or more or all of the following.

The forming assembly may be above the conveyor.

The forming assembly may be moveable in a direction opposite that of the conveyor.

The plurality of parallel cylinders may include a plurality of parallel tubes.

The oven forming assembly may further include at least one corrugated dough crust in between the at least one parallel cylinder and the at least one base. The at least one corrugated dough crust may include: a top surface in contact with the at least one base; and a bottom surface in contact with the at least one parallel cylinder, the bottom surface opposing the top surface and defining one of: at least two parallel grooves formed adjacent the at least one parallel cylinder separated by at least one parallel ridge extending in a space adjacent the at least one parallel cylinder; at least two parallel ridges extending in spaces adjacent the at least one parallel cylinder separated by at least one parallel groove formed adjacent the at least one parallel cylinder; and at least one parallel ridge extending in a space adjacent the at least one parallel cylinder.

Spacing between the parallel grooves may be about one inch to about one and three-quarters of an inch.

The parallel grooves may extend about one quarter to about one half the way to the top surface of the crust.

In still another aspect a method for proofing and cooking corrugated dough crusts is disclosed that may include: positioning at an infeed end of a conveyor a top surface of at least one dough piece in contact with the conveyor and an opposing bottom surface of the at least one dough piece in contact with at least one parallel cylinder of an opposing forming assembly comprising a plurality of parallel cylinders and spaces in an alternating series; moving the at least one dough piece on the conveyor under the opposing forming assembly into an oven proofing the dough piece to form therefrom at least one proofed dough piece; and moving the at least one proofed dough piece on the conveyor under the opposing forming assembly through the oven at least partially baking and setting the proofed dough piece to form therefrom at least one cooked, proofed dough crust.

Particular implementations may include one or more or all of the following.

The step of moving the at least one dough piece on the conveyor under the opposing forming assembly into an oven may include moving the at least one dough piece on the conveyor under the opposing forming assembly into an oven proofing the dough piece to form therefrom at least one proofed dough piece having a bottom surface defining one of: at least two parallel grooves formed adjacent the at least one parallel cylinder separated by at least one parallel ridge extending in a space adjacent the at least one parallel cylinder; at least two parallel ridges extending in spaces adjacent the at least one parallel cylinder separated by at least one parallel groove formed adjacent the at least one parallel cylinder; and at least one parallel ridge extending in a space adjacent the at least one parallel cylinder.

The method may further include removing the at least one cooked, proofed dough crust from a discharge end of the conveyor.

The foregoing and other aspects and implementations of an oven forming assembly for proofing and cooking corrugated dough crusts may have one or more or all of the following advantages, as well as other benefits discussed elsewhere in this document.

The system, oven forming assembly, and method for proofing and cooking corrugated dough crusts allow for a wider variety of food items to be cooked and/or reheated with a roller grill, besides just cylindrical items. Any relatively flat food item employing a cooked corrugated dough crust can be cooked and/or reheated on a roller grill, such as pizzas, pastries, pies, hamburgers, sandwiches, tortas, tostadas, foccacia, flat breads, and the like. They will not slide off of the roller grill when placed on it.

The foregoing and other aspects, features, and advantages will be apparent to those of ordinary skill in the art from the DESCRIPTION and DRAWINGS, and from the CLAIMS.

BRIEF DESCRIPTION OF DRAWINGS

Implementations will hereinafter be described in conjunction with the appended DRAWINGS (which are not necessarily to scale), where like designations denote like elements, and.

DESCRIPTION

This document features a system, an oven forming assembly, and a method for proofing and cooking corrugated dough crusts. There are many features of the foregoing disclosed herein, of which one, a plurality, or all features or steps may be used in any particular implementation.

In the following description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

In describing implementations, the following terminology will be used in accordance with the definitions and explanations set out below. Notwithstanding, other terminology, definitions, and explanations may be found throughout this document as well.

"Corrugated" (or the synonyms furrowed, channelled, ridged, grooved, etc.) as used herein refers to any alternating series of any number of parallel grooves and/or ridges. For example, one groove or one ridge would still be considered corrugated, or one ridge and two grooves or one groove and two ridges would still be considered corrugated.

"Proofed" as used herein refers to prepared dough that is allowed to rise, in and/or under a forming assembly, partially filling or filling the forming assembly, to create a top surface and an opposing bottom surface on the dough, and to impart the desired texture and thickness attributes of the dough (and hence the eventual baked crust).

Corrugated Dough Crusts and Roller Grill Systems

There are a variety of proofed, cooked corrugated dough crust implementations for use with a roller grill. Generally, the corrugated crust may include a top surface. Opposite the top surface is a bottom surface intended to be in contact with rollers of a roller grill. The bottom surface may define at least two parallel grooves separated by at least one parallel ridge, or at least two parallel ridges separated by at least one parallel groove, or at least one parallel ridge.

Figure 1:
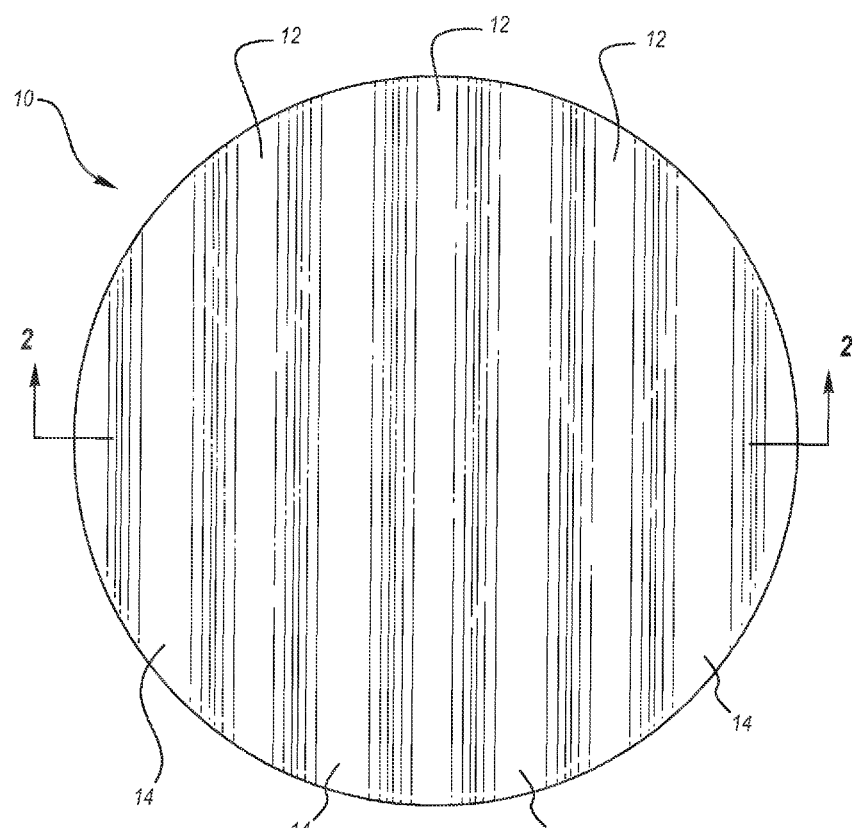
FIG. 1 is a bottom view of an implementation of a corrugated crust.
Figure 2:
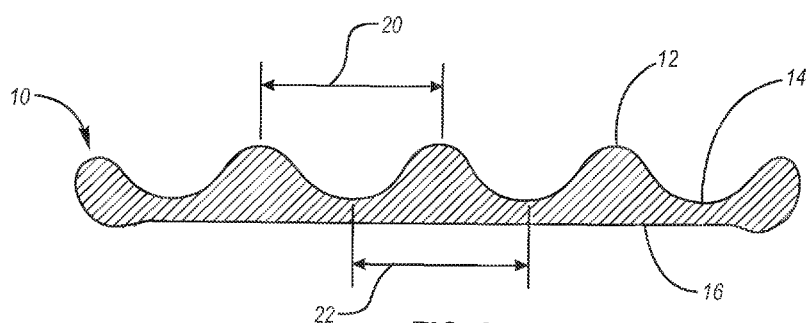
FIG. 2 is a cross-sectional side view of the corrugated crust implementation of FIG. 1 taken along line 2-2 of FIG. 1.

Notwithstanding, turning to FIGS. 1-2 and for the exemplary purposes of this disclosure, proofed, cooked corrugated dough crust 10 is shown. Proofed, cooked corrugated dough crust 10 may be a proofed, cooked pizza crust for example.

Crust 10 includes a top surface. Opposite the top surface is a bottom surface intended to be in contact with rollers of a roller grill. The bottom surface defines a plurality of parallel grooves 14 separated by parallel ridges 12 in an alternating series.

The crust may have any rectilinear or curvilinear shape. For, example, if the crust 10 is a pizza crust for example, crust 10 may have a circular, rectangular, or square shape. The top surface may include at least one outer edge defining a recess 16. Recess 16 could provide a surface to maintain toppings for example, like pizza toppings or glaze or torta or tostada toppings for example. For a circular or other curvilinear shaped crust, there might be just one edge. For rectilinear shaped crusts, there might be three or more edges (e.g., three edges for a triangular shaped crust or four edges for a square or rectangular shaped crust).

The spacing 22 between parallel grooves 14 may be any spacing that matches or corresponds to the spacing of rollers on a roller grill. For example, the spacing 22 between parallel grooves 14 may be about one inch to about one and three-quarters of an inch and spacing 20 between parallel ridges 12 may be about one inch to about one and three-quarters of an inch. In particular implementations, the spacing 22 between parallel grooves 14 may be about one and one-quarter of an inch to about one and one-half of an inch and spacing 20 between parallel ridges 12 may be one and one-quarter of an inch to about one and one-half of an inch. The spaces 22 between grooves 14 and the spaces 20 between ridges 12 do not have to be equal.

The parallel grooves 14 may extend about one quarter to about three quarters of the thickness of the crust 10. In particular implementations the parallel grooves 14 may extend about one half of the thickness of the crust 10.

There are a variety of roller grill system implementations that provide for a proofed, cooked corrugated dough crust. A corrugated crust roller grill system may generally include a roller grill including a plurality of parallel rollers (e.g., stainless steel) and spaces in an alternating series. The roller grill may also feature, for example, a body, separate on/off switch(es) to operate front rollers or rear rollers and separate variable heat control(s). At least one corrugated crust is also included in the system that includes a top surface and an opposing bottom surface in contact with the rollers of the roller grill. The bottom surface may define at least two parallel grooves separated by at least one parallel ridge, or at least two parallel ridges separated by at least one parallel groove, or at least one parallel ridge. The parallel grooves rest on top of the rollers and the parallel ridges extend in spaces between the rollers.

Figure 5:
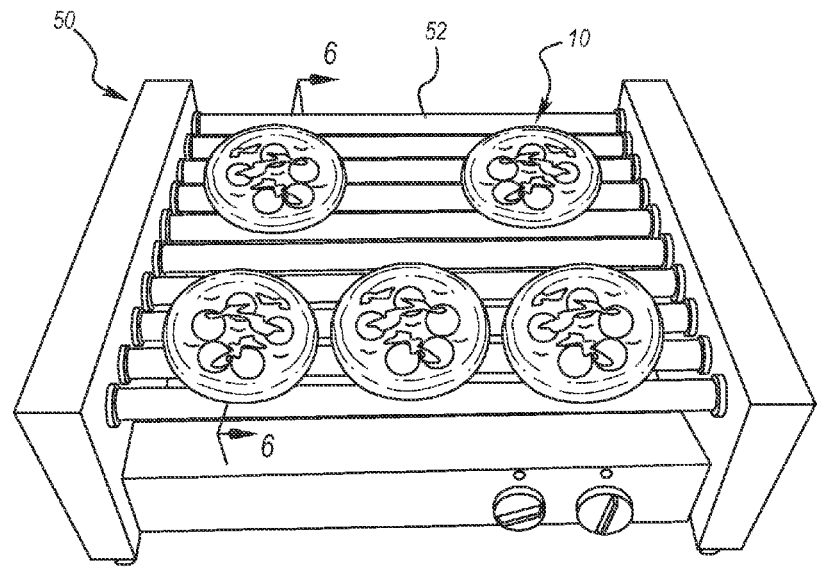
FIG. 5 is a top perspective view of an implementation of a corrugated crust roller grill system.
Figure 6:
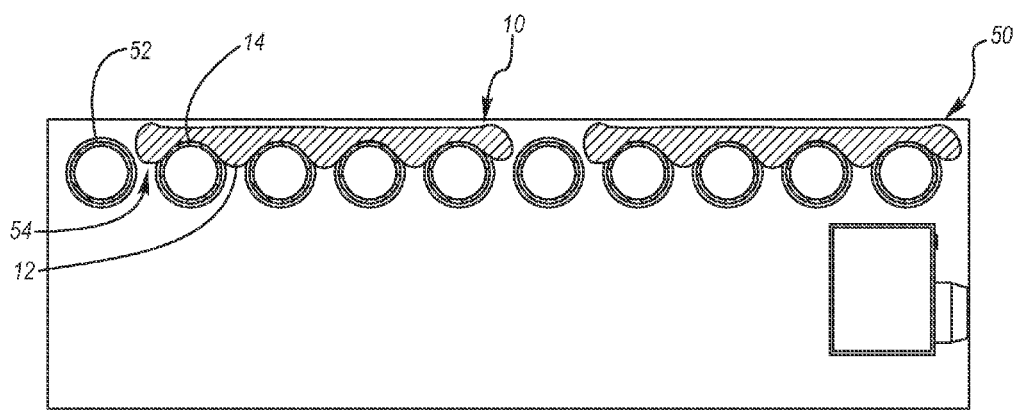
FIG. 6 is a cross-sectional side view of the corrugated crust roller grill system implementation of FIG. 5 taken along line 6-6 of FIG. 5.

Notwithstanding, turning to FIGS. 5-6 and for the exemplary purposes of this disclosure, roller grill system 50 is shown. Roller grill system 50 may cook and/or reheat any number of proofed, cooked corrugated dough crusts 10, which may be proofed, cooked pizza crusts for example as depicted. Pizza is a food product that continues to increase in popularity and in the varieties of pizzas that are available. However, until this disclosure, there were limited ways to provide pizzas to consumers in convenience stores for example. Some stores have stand alone ovens or microwaves that you have to cook the frozen pizzas in. But this takes time for a consumer and often does not produce an appetizing pizza that is crisp or cooked evenly, etc. Now, with the present disclosure, for the first time pizzas can be offered and provided at self-serve locations like convenient stores on very convenient roller grills. The pizzas "stay" on the roller grill and can cook and/or re-heat in a matter of minutes, evenly heating the bottom surface of the pizza. Then the pizzas can just remain rolling in place on the roller grill waiting to be picked up by a consumer without having to wait.

Roller grill system 50 includes a plurality of parallel rollers 52 and spaces 54 in an alternating series. Corrugated crusts 10 are also included each having a top surface and an opposing bottom surface in contact with the rollers 52 of the roller grill. The bottom surface may define parallel grooves 14 separated by parallel ridges 12. The parallel grooves 14 rest on top of the rollers 52 and the parallel ridges 12 extend in spaces 54 between the rollers 52. In this manner, the pizzas with crusts 10 having grooves 14 and ridges 12 extending in the spaces 54 between rollers 52 will not roll off of the roller grill when placed on it, but will remain where they are set rolling in place on the roller grill.

Other Implementations

Many additional implementations are possible.

For the exemplary purposes of this disclosure, although there are a variety of roller grill system implementations, one such implementation may be a modification to a roller grill itself rather than to the bottom surface of a crust. For example, a roller grill retaining system may be used atop the rollers (held in position slightly above the rollers so the rollers can still turn beneath) to retain an item on the roller grill while cooking. Flat crusts would have the tendency to roll off of the roller grill as the rollers turn, but with a retaining structure they are held in place on the rollers as they turn within the confines of the retaining structure. Thus, this modification is ideal for cooking a flat crust on a roller grill, but it may also be used for any item that could not previously be cooked on a roller grill without falling off.

In general a roller grill retaining system in some implementations may form a grid pattern framework of retaining members—some of the retaining members running perpendicular to the rollers and some retaining members running parallel to the rollers for example. The crossing members form compartments or enclosures there between that can keep any flat crust on a roller grill. Flat crusts would have the tendency to roll off of the roller grill as the rollers turn, but now they are held in place on the rollers as they turn within the confines of the compartments or enclosures. The compartments or enclosures may be any size and number depending on the surface area of the roller grill, the size of crusts, and the like.

Alternatively, rather than a grid pattern framework of retaining members, only retaining members that run horizontally and parallel with the rollers can be used. Since the direction a flat crust would roll of the roller grill would be perpendicular to the rollers, the horizontal retaining members would stop any crust as well. Again, there can be any number of horizontal retaining members used atop the rollers depending on how many sections you want to divide the roller grill into, and the like. For example, there could be just one horizontal retaining member across the front edge of the roller grill.

Thus, there are a variety of retaining structures suitable for use with a roller grill configured to retain an item on the roller grill. While any item, crust or otherwise, could be cooked on a roller grill retaining system, for the exemplary purposes of this disclosure, the following embodiments and drawings illustrate roller grill retaining systems cooking pizza 11. Pizza 11 is similar to proofed, cooked, corrugated dough crust 10 as previously described, but differs primarily in that pizza 11 has a flat bottom surface as opposed to a corrugated bottom surface.

Turning to FIGS. 7-12 and for the exemplary purposes of this disclosure, implementations of a roller grill with a retaining structure are shown. Modified roller grill retaining systems 90, 91, 92 and 93 include roller grill 50, with plurality of parallel rollers 52 and spaces 54, and retaining structures 80, 81, 82, and 83, respectively. Retaining structure 80, 81, 82, and 83 may include intermediate retaining members 62, 63, 67, or 69, interval dividers 64 or 65, support members 66 or 78, front end retaining members 74 or 77, back end retaining members 75 or 79, and side retaining members 76, as described below.

Figure 7:
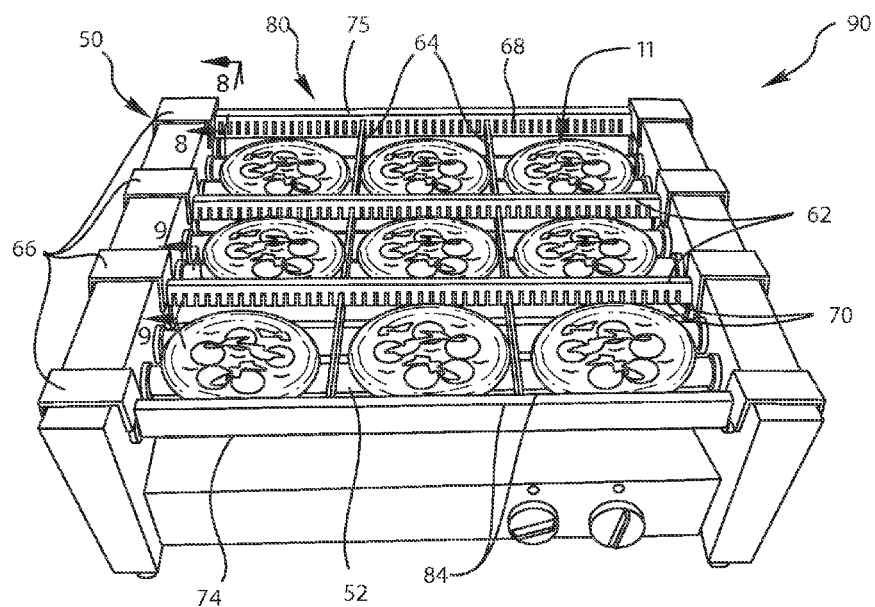
FIG. 7 is a top front perspective view of an implementation of a roller grill retaining system.

Referring now to FIG. 7, an implementation of roller grill retaining system 90 is shown. The primary focus of this aspect of the disclosure is retaining structure 80. Intermediate retaining members 62, interval dividers 64, and front and back end retaining members 74, 75 form a grid, thus creating individual compartments 84 or enclosures. In FIG. 7, retaining structure 80 creates nine compartments 84; however, retaining structure 80 may be altered to form individual compartments 84 of any size and amount.

In some implementations, front and back end retaining members 74, 75 are parallel to rollers 52 and preferably extend from side to side of roller grill 50. Front end retaining member 74 is located at the front end of roller grill 50 and back end retaining member 75 is located at the back end of roller grill 50.

Front and back end retaining members 74, 75 may either be an integral part of roller grill 50 or may be coupled to roller grill 50 by a support member 66. The coupling of front and back end retaining members 74, 75 to the sides of roller grill 50 may be accomplished with adhesive, a weld, or fasteners, but in a preferred embodiment, support member 66 is a bracket formed to hook over and hang from the sides of a roller grill. Support member 66 may be an integral part of front and back end retaining members 74, 75 or may be a separate piece that is coupled with front and back end retaining member 74, 75 and/or the sides of roller grill 50 by use of an adhesive, a weld, or fasteners.

Figure 8:
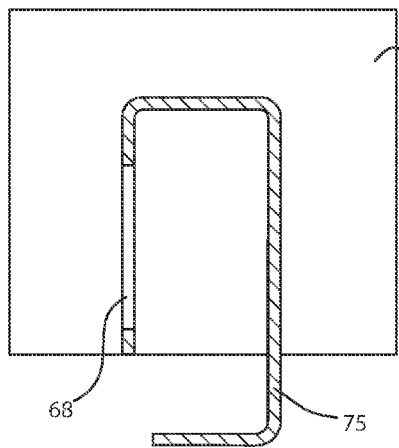
FIG. 8 is a cross-sectional side view of the roller grill retaining system implementation of FIG. 7 taken along line 8-8 of FIG. 7.

FIG. 8 depicts a preferred cross-sectional shape of back end retaining member 75; however, other cross-sectional shapes are considered within the scope of this disclosure. The cross-section is substantially rectangular with an edge that has a series of slots 68. The series of slots 68 are configured to removably couple with interval dividers 64, which will be explained in further detail below. Although the number of slots 68 in the series may vary, preferably more slots 68 are included to increase the adjustability of retaining structure 80 to accommodate varying amounts and types of food items to be cooked with roller grill retaining system 90. Front end retaining member 74 also has an edge that has a series of slots 68 facing the edge with a series of slots 68 on back end retaining member 75.

Figure 11:
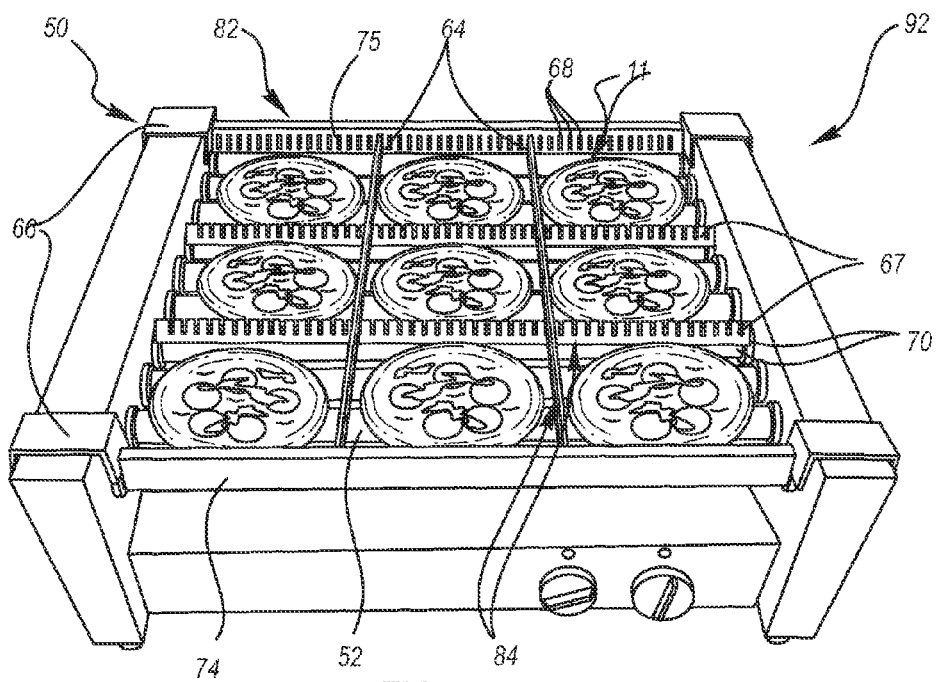
FIG. 11 is a top front perspective view of still another implementation of a roller grill retaining system with only the end retaining members having support members.

Returning to FIG. 7, in between front and back end retaining members 74, 75 are intermediate retaining members 62 that are also parallel to rollers 52. The number of intermediate retaining members 62 may vary in particular implementations. In some implementations, including that shown in FIG. 7, intermediate retaining members 62 are coupled to the sides of roller grill 50 in a similar manner as front and back end retaining members 74, 75. However, this is not required, as depicted in FIG. 11. The roller grill retaining system 92 of FIG. 11 includes retaining structure 82, which differs from retaining structure 80 only in that intermediate retaining members 67 are not coupled to the sides of roller grill 50 in a similar manner as front and back end retaining members 74, 75 like intermediate retaining members 62 are. In any embodiment, the distance between each intermediate retaining member 62, 63, 67, or 69 or front and back end retaining members 74, 77, 75, 79 may be the same or different.

Figure 9:
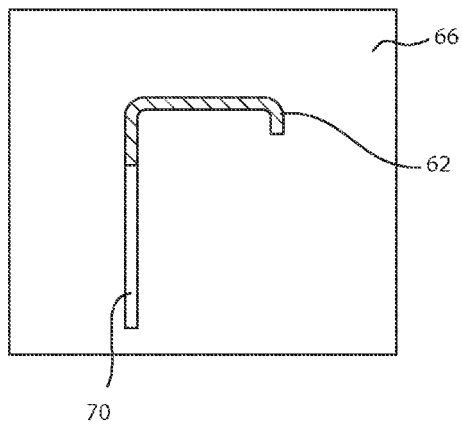
FIG. 9 is a cross-sectional side view of the roller grill retaining system implementation of FIG. 7 taken along line 9-9 of FIG. 7.

Two intermediate retaining members 62 are shown in FIG. 7 with a preferred cross-sectional shape in FIG. 9. Intermediate retaining members 62 preferably include a series of notches 70 on an edge thereof as depicted in FIGS. 7 and 9. The notches 70 are configured to removably fit over interval dividers 64. As with the series of slots 68, any number of notches 70 may be included in intermediate retaining members 62, but more notches 70 accommodates greater variety. The number of notches 70 in the series is preferably the same as the number of slots 68 in the series.

Interval dividers 64 are perpendicular to rollers 52 and preferably extend from the front end to the back end of the roller grill 50. As mentioned above, interval dividers 64 are configured to removably fit in the series of slots 68 and series of notches 70 such that interval dividers 64 are coupled to front and back end retaining members 74, 75 and intermediate retaining members 62 to form a grid with individual roller grill compartments 84 to cook and retain food items regardless of whether the food items are cylindrical or any other shape.

Front and back end retaining members 74, 75, intermediate retaining members 62, and interval dividers 64 of retaining structure 80 are positioned above rollers 52. But there is no contact between the listed parts and rollers 52, thus simultaneously allowing rollers 52 to roll and providing a barrier to prevent food items from rolling out of place, and especially from rolling off the roller grill 50.

Figure 10:
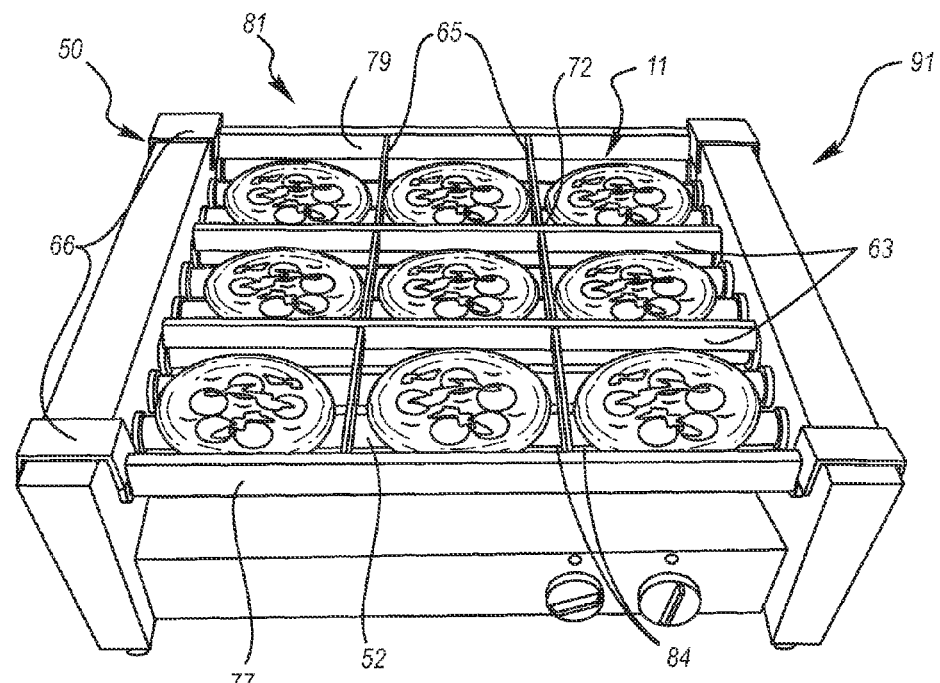
FIG. 10 is a top front perspective view of another implementation of a roller grill retaining system with a preformed unitary grid structure.

In an alternative embodiment, a retaining structure 81 includes a preformed unitary grid 72. Preformed unitary grid 72 includes intermediate retaining members 63, interval dividers 65, and front and back end retaining members 77, 79. But because grid 72 is preformed and unitary, the parts do not include series of slots 68 or notches 70. Preformed unitary grid 72 may be preformed to provide for the desired number of compartments 84. An exemplary implementation of a preformed unitary grid 72 is illustrated in FIG. 10. Support members 66, as discussed above, may couple preformed unitary grid 72 to roller grill 50. Alternatively, preformed unitary grid 72 may be an integral part of roller grill 50.

Figure 12:
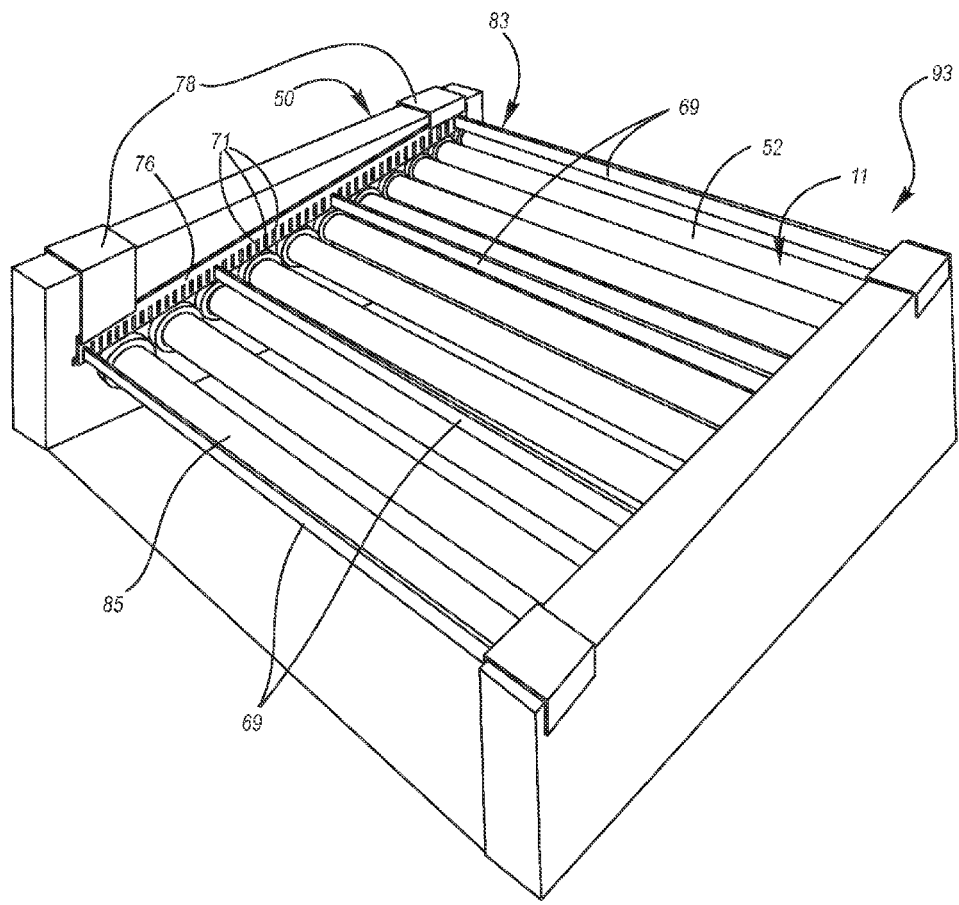
FIG. 12 is a top front perspective view of yet another implementation of a roller grill retaining system without interval dividers.
Figure 13:
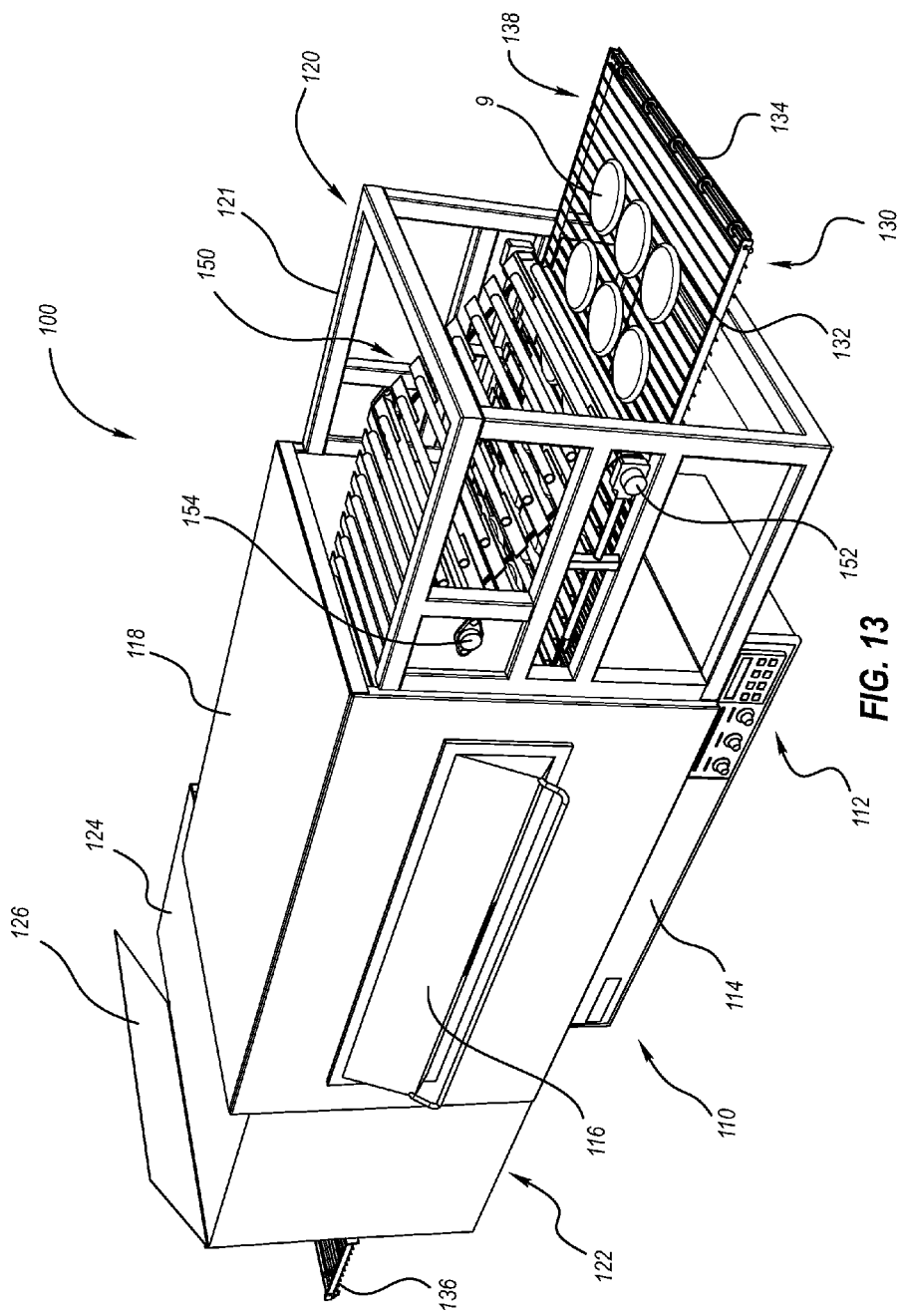
FIG. 13 is a front, broken away, load end perspective view of an implementation of an oven forming assembly for proofing and cooking corrugated dough crusts.
Figure 14:
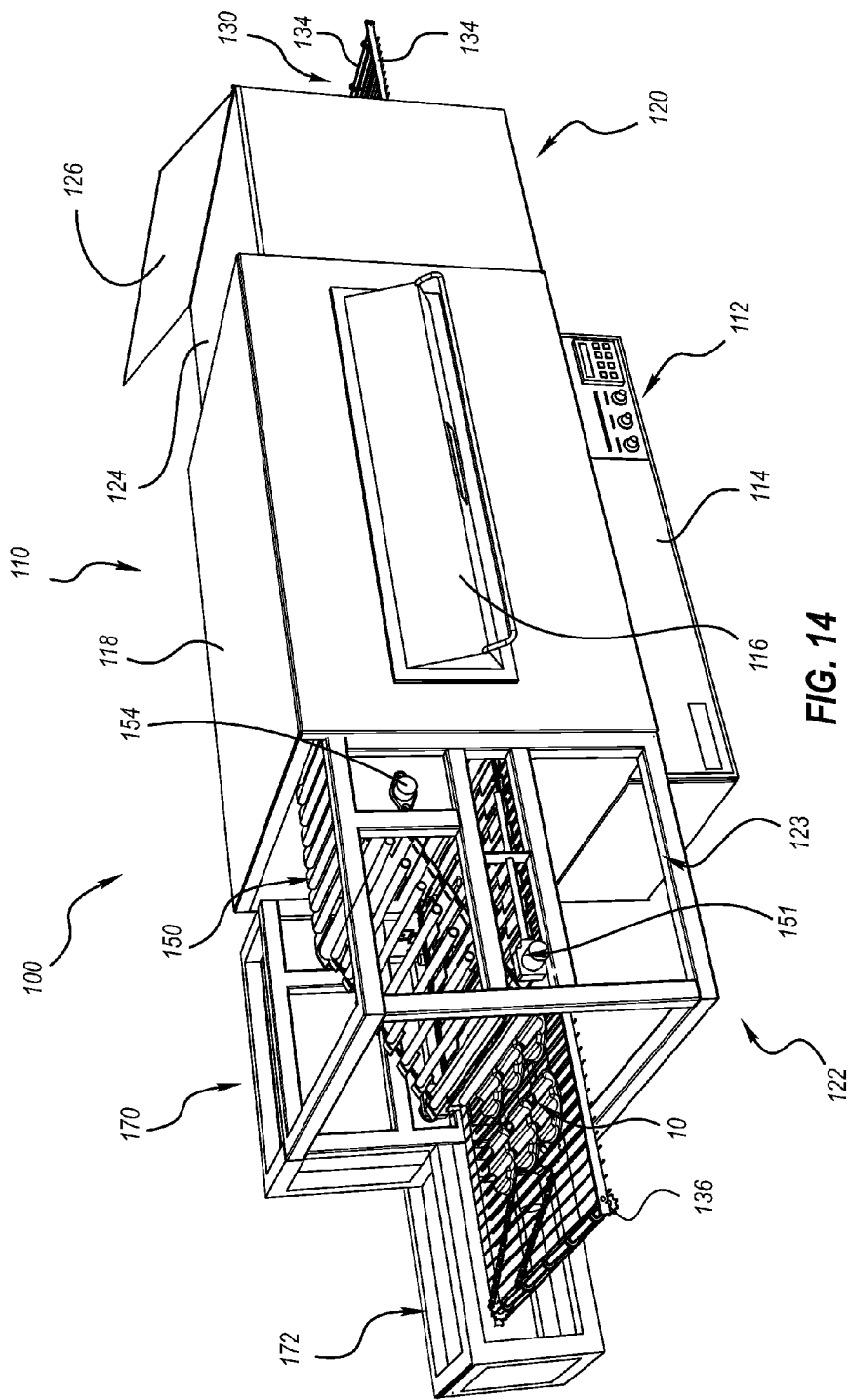
FIG. 14 is a front, broken away, unload end perspective view of the oven forming assembly of FIG. 13.
Figure 15:
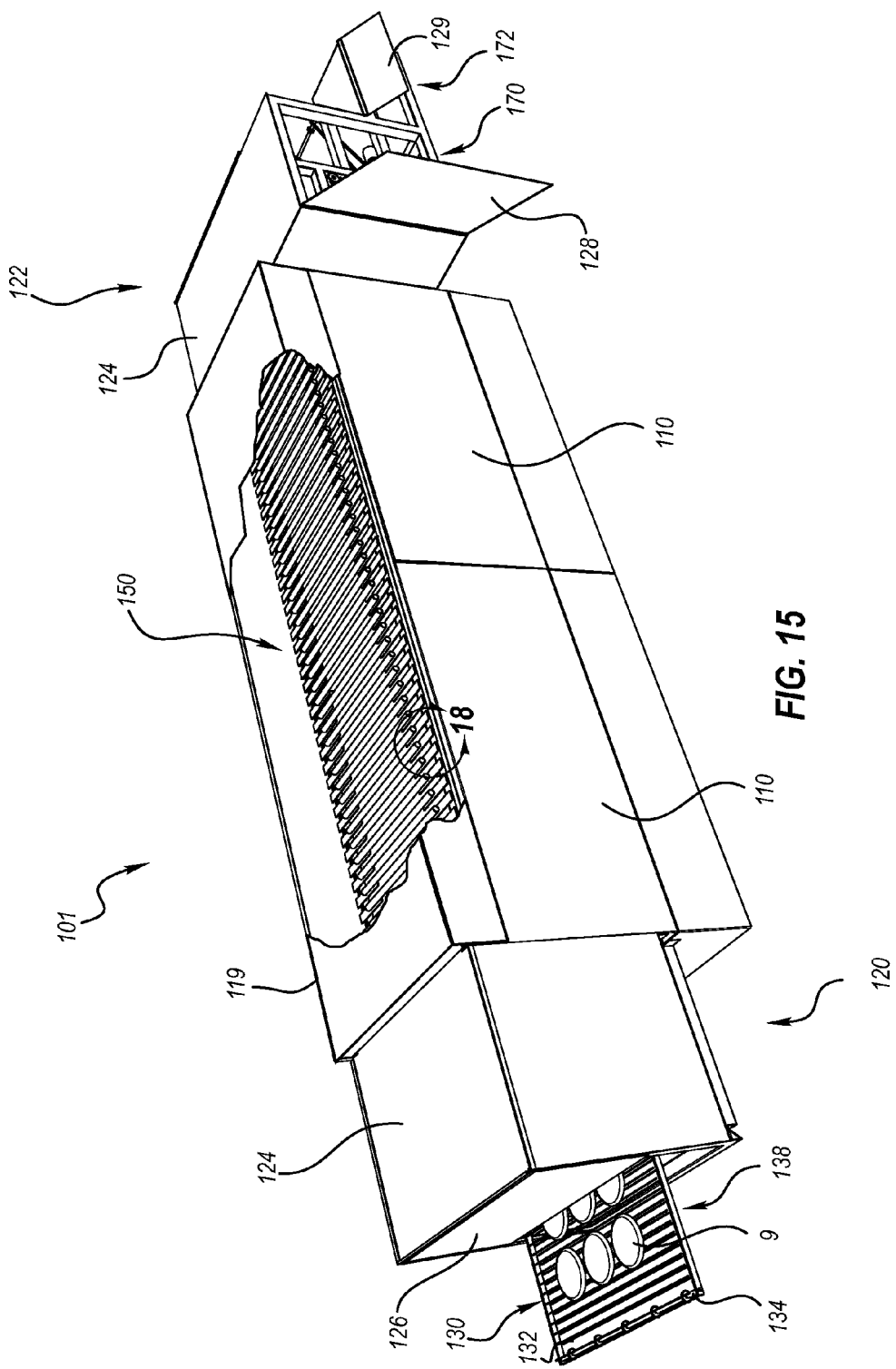
FIG. 15 is a rear, broken away, load end perspective view of another implementation of an oven forming assembly for proofing and cooking corrugated dough crusts.
Figure 16:
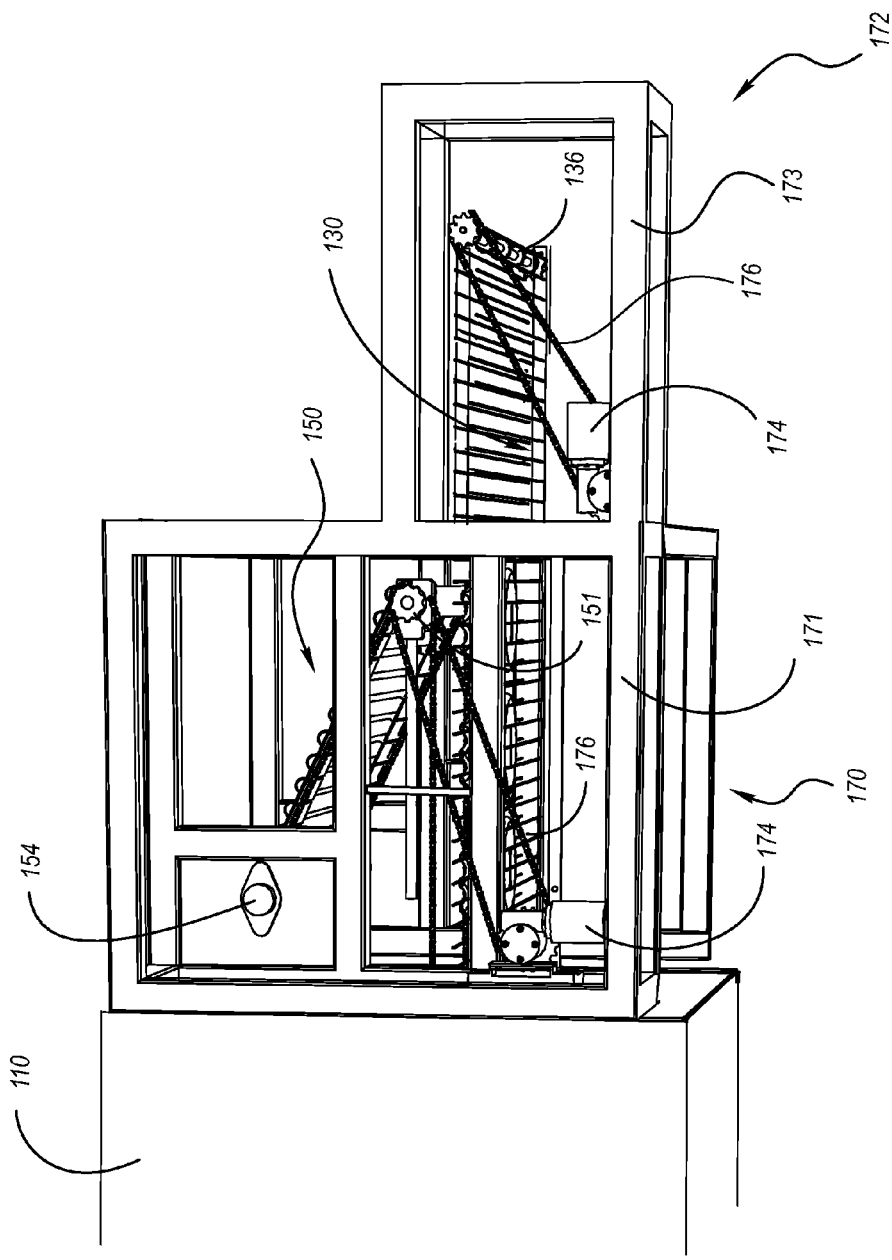
FIG. 16 is a broken away side view of the unload end of the oven forming assembly of FIG. 13 or FIG. 15.
Figure 17:
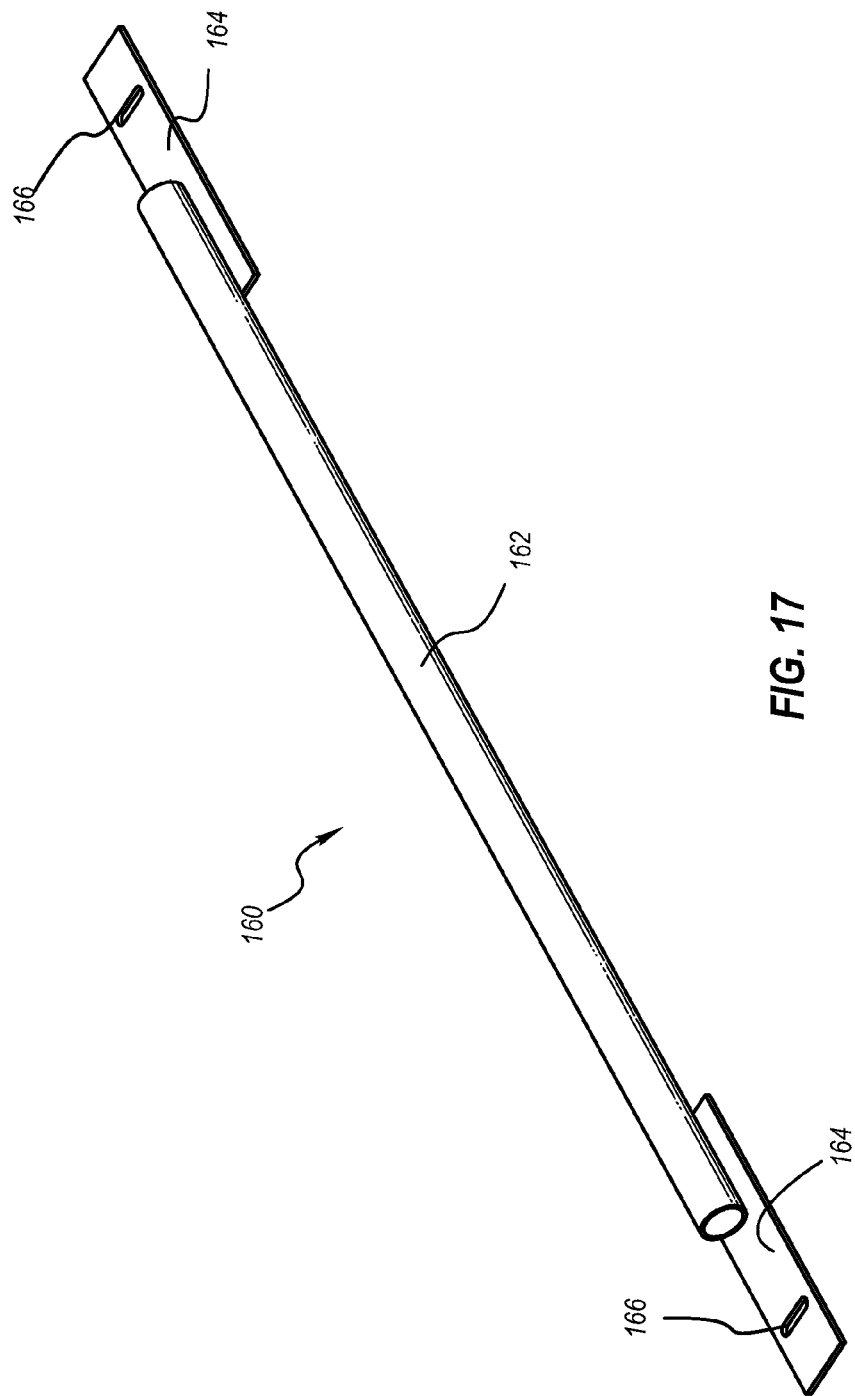
FIG. 17 is a perspective view of a forming member of the oven forming assembly of FIG. 13 or FIG. 15.
Figure 18:
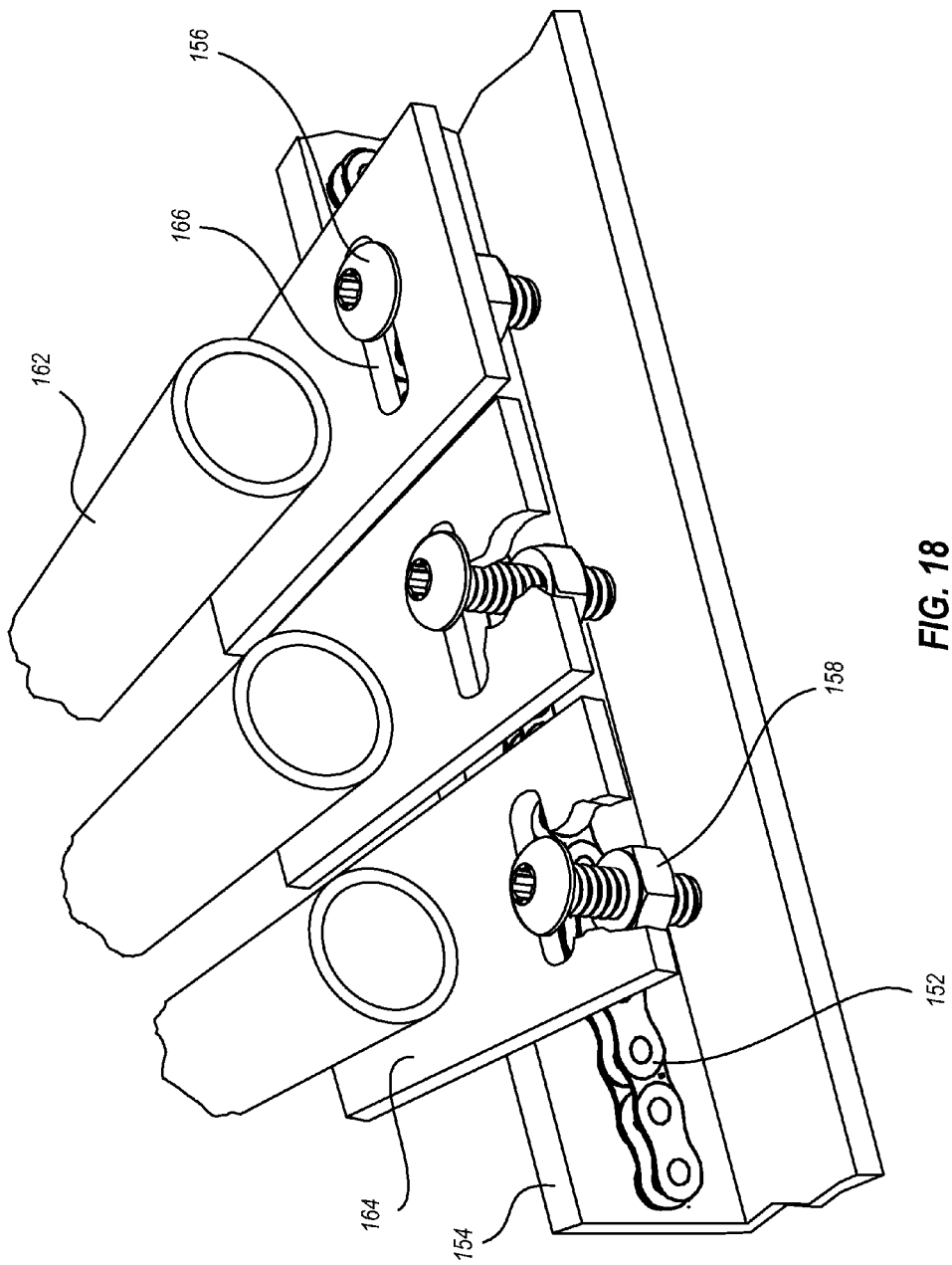
FIG. 18 is an enlarged, broken away, perspective view for magnification purposes taken from the oven forming assembly of FIG. 15.
Figure 19:
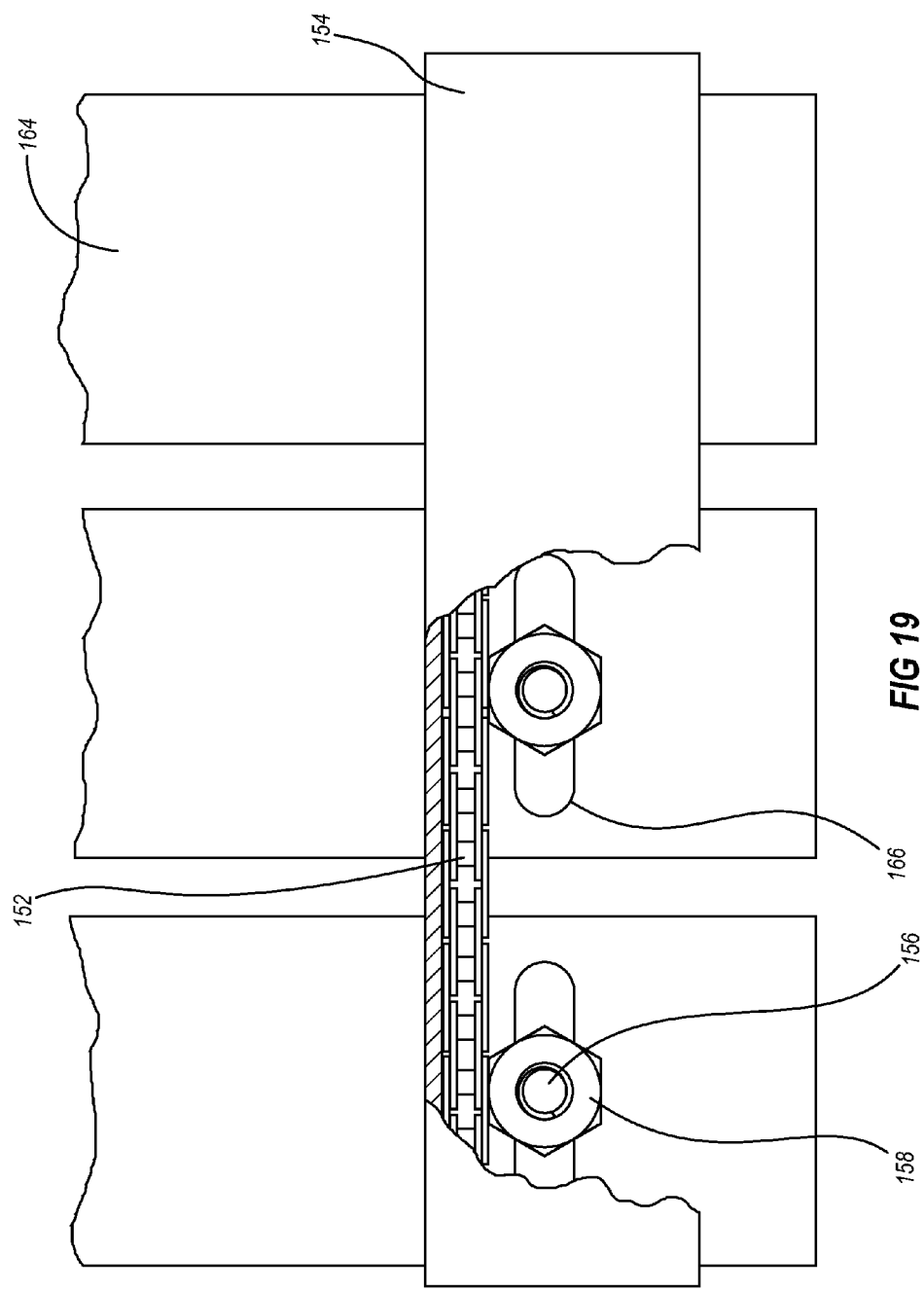
FIG. 19 is a bottom, broken away view of FIG. 18.

In yet another implementation illustrated in FIG. 12, roller grill retaining system 93 with retaining structure 83 includes side retaining members 76. Side retaining members 76 include an edge with a series of slots 71 configured to removably couple to retaining members 69. Retaining members 69 of this implementation are similar to those described above, but do not have series of notches 70. As is clear from this implementation, interval dividers 64 are not required for roller grid systems. Thus, multiple rows 85 are created by this implementation of retaining structure 83, rather than a grid system with compartments 84, and retaining members 69 retain food items in a particular row 85. Because the direction an item would roll off the roller grill 50 would be perpendicular to the rollers 52, this implementation would be sufficient to retain any food item as well. Although three rows 85 are shown in FIG. 12, the series of slots 71 in the side retaining members 76 allows for adjustment in both the number of rows 85 and the size of rows 85.

Side retaining members 76 may be coupled to roller grill 50 by use of an adhesive, a weld, or fasteners. Preferably, support members 78 couple side retaining members 76 to the sides of the roller grill 50. In some implementations, support members 78 are brackets configured to hook over and hang from the sides of roller grill 50. The length of the part of the brackets that hang over the inside of the roller grill 50 will vary according to whether the bracket is located closer to the front of the roller grill 50 or the back of the roller grill 50. Side retaining members 76 are coupled to support members 78 by an adhesive, a weld, fasteners, or a mechanical interlock.

Other implementations are envisioned and within the scope of the present disclosure. For example, a retaining structure may be a grid that does not include parts that are parallel and perpendicular to rollers 52. Instead the grid may be formed with diagonal members that form individual roller grill compartments.

Further implementations are within the CLAIMS.
Specifications, Materials, Assembly, and Manufacture It will be understood that implementations are not limited to the specific components disclosed herein, as virtually any components consistent with the intended operation of a system implementation, an oven forming assembly implementation, and a method implementation for proofing and cooking corrugated dough crusts, roller grill retaining system implementation, and/or corrugated crust roller grill system implementation may be utilized. Accordingly, for example, although particular components and so forth, are disclosed, such components may comprise any shape, size, style, type, model, version, class, grade, measurement, concentration, material, weight, quantity, and/or the like consistent with the intended operation of a system implementation, an oven forming assembly implementation, and a method implementation for proofing and cooking corrugated dough crusts, roller grill retaining system implementation, and/or corrugated crust roller grill system implementation. Implementations are not limited to uses of any specific components, provided that the components selected are consistent with the intended operation of a system implementation, an oven forming assembly implementation, and a method implementation for proofing and cooking corrugated dough crusts, roller grill retaining system implementation, and/or corrugated crust roller grill system implementation.

Accordingly, the components defining any a system implementation, an oven forming assembly implementation, and a method implementation for proofing and cooking corrugated dough crusts, roller grill retaining system implementation, and/or corrugated crust roller grill system implementation may be formed of any of many different types of materials or combinations thereof that can readily be formed into shaped objects provided that the components selected are consistent with the intended operation of a system implementation, an oven forming assembly implementation, and a method implementation for proofing and cooking corrugated dough crusts, roller grill retaining system implementation, and/or corrugated crust roller grill system implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, spring steel, any combination thereof, and/or other like materials; alloys, such as aluminum alloy, titanium alloy, magnesium alloy, copper alloy, any combination thereof, and/or other like materials; any other suitable material; and/or any combination thereof.

Various a system implementation, an oven forming assembly implementation, and a method implementation for proofing and cooking corrugated dough crusts, roller grill retaining system implementations, and/or corrugated crust roller grill system implementations may be manufactured using conventional procedures as added to and improved upon through the procedures described here. Some components defining corrugated crust forming assembly implementations, roller grill retaining system implementations, and/or corrugated crust roller grill system implementations may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of a system implementation and an oven forming assembly implementation for proofing and cooking corrugated dough crusts, roller grill retaining system implementations, and/or corrugated crust roller grill system implementations are not limited to the specific order of steps as disclosed in this document. Any steps or sequence of steps of the assembly of such implementations indicated herein are given as examples of possible steps or sequence of steps and not as limitations, since various assembly processes and sequences of steps may be used to assemble such implementations.

In general, making a proofed, frozen corrugated cooked dough crust as described earlier may include: proofing a dough piece having a top surface and a bottom surface intended to be in contact with a roller grill; baking the proofed dough; and imparting a plurality of grooves on the bottom surface of the dough. The dough may be frozen before or after the grooves are imparted to the bottom surface of the dough. Baking the proofed dough may be after the grooves are imparted to the bottom surface of the dough. Imparting a plurality of grooves on the bottom surface of the dough may be done during the proofing stage.

For the exemplary purposes of this disclosure, for pizza dough, a dough piece may be prepared from any pizza dough formula. The prepared dough may then be placed in a forming assembly and proofed, or allowed to rise, in and around the assembly, substantially filling the assembly. This proofing step imparts the desired texture and thickness attributes of the dough (and the eventual baked crust). Either simultaneously or after the forgoing proofing step the top surface of the dough may be shaped to accommodate pizza or other toppings or fillings. The proofed dough is then at least partially baked in the forming assembly to set the dough. The proofed cooked dough crust can then be removed from the forming assembly, frozen, packaged, and stored or distributed under frozen conditions.

The grooves and ridges can be imparted to the bottom surface of the dough prior to freezing the dough, such as during the proofing stage prior to baking. The baking step acts to "set" the grooves and ridges in the dough piece, so the grooves and ridges can maintain the crust on a roller grill during the reheating or re-baking by the consumer. Because a proofed dough piece is relatively delicate, dough that is proofed and baked in contact with the forming assembly is a very convenient way of imparting grooves and ridges to the dough.

In conjunction with proofing and baking, the dough piece can be placed on/under a forming assembly having ridges, etc. corresponding to the grooves to be imparted to the dough piece. Then, after proofing on/under the forming assembly, the proofed dough can be baked in conjunction with the forming assembly. Then the forming assembly can be removed prior to freezing and further processing. After that, all that remains is to remove the cooked dough crust from the forming assembly and freeze and further process it.

Alternatively, the grooves can be cut or notched into the proofed cooked dough crust after it has been frozen, prior to packaging the dough crust.

The end consumer can then remove a proofed, frozen cooked dough crust from the freezer without needing to thaw the crust, place it on a roller grill with the grooved bottom surface of the crust in contact with the rollers, apply toppings or fillings to the top surface of the crust if desired and not already present, and bake again or re-heat the crust to provide a crust for consumption. The grooves and ridges on the bottom surface of the crust keep the crust on the roller grill, so that the crust does not roll off of the roller grill.

Thus, to form a corrugated crust as described previously, there are a variety of forming assembly implementations that provide for the proofing and cooking of a corrugated dough crust.

In one aspect, a forming assembly system for proofing and cooking a corrugated dough crust may include a forming assembly including: at least one cross member; at least one parallel tube coupled to or integral with the at least one cross member separated by at least one parallel space; and at least one plate opposing the at least one parallel tube. A corrugated crust may be in between the at least one parallel tube and the at least one plate. The crust may include a top surface in contact with the at least one plate and an opposing bottom surface in contact with the at least one parallel tube. The bottom surface may define at least two parallel grooves separated by at least one parallel ridge, or at least two parallel ridges separated by at least one parallel groove, or at least one parallel ridge. The parallel grooves form adjacent the tubes and the ridges extend in spaces between the tubes.

Figure 3:
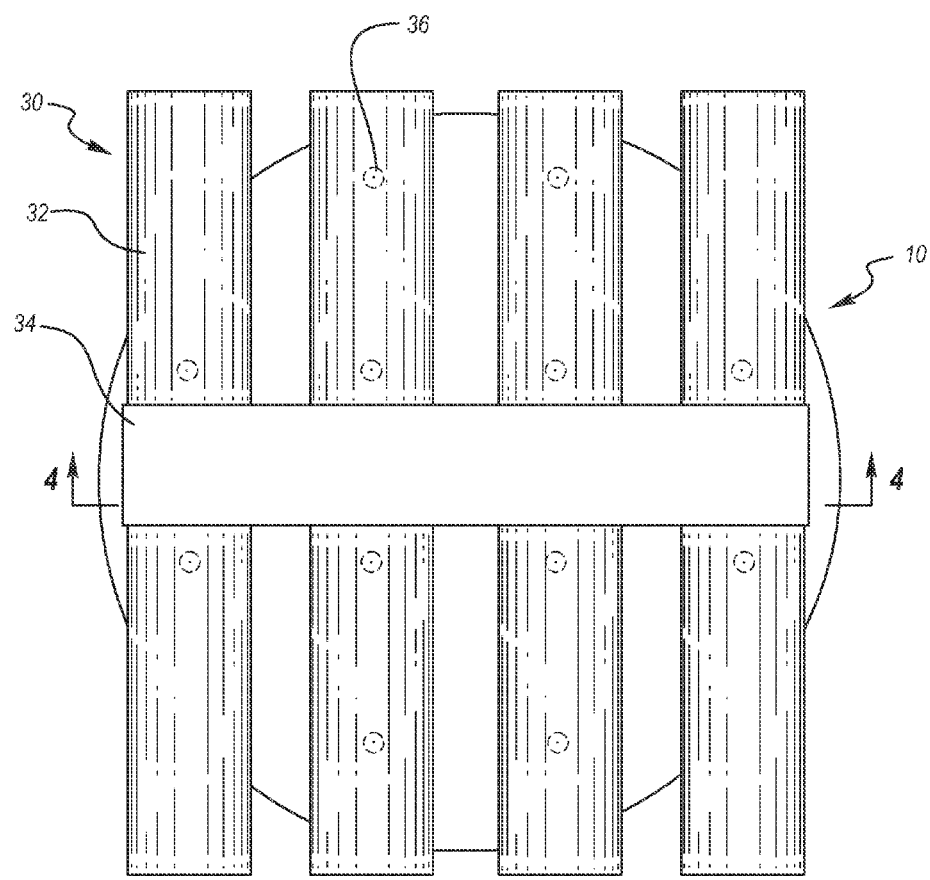
FIG. 3 is a top view of an implementation of a corrugated crust forming assembly.
Figure 4:
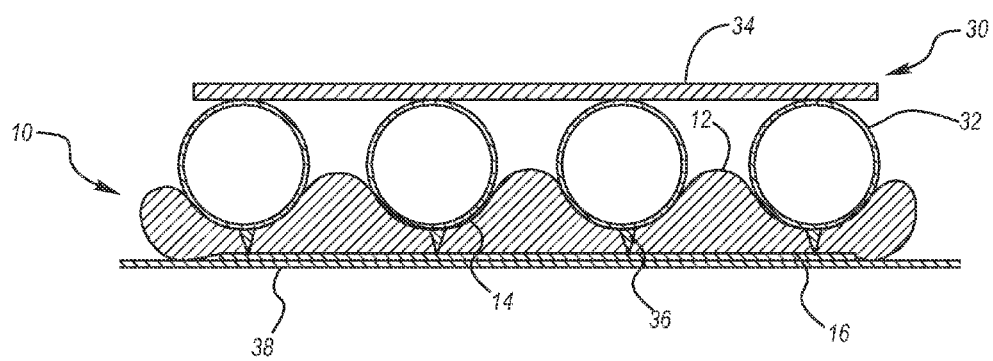
FIG. 4 is a cross-sectional side view of the corrugated crust forming assembly implementation of FIG. 3 taken along line 4-4 of FIG. 3.

Notwithstanding, turning to FIGS. 3-4 and for the exemplary purposes of this disclosure, forming assembly 30 is shown. Forming assembly 30 may provide for the proofing and cooking of a pizza crust for example. The crust 10 shown in FIGS. 3-4 is formed upside down.

Forming assembly 30 includes cross member 34. Parallel tubes 32 are also included and are separated by parallel spaces. Parallel tubes 32 and the parallel spaces are used to impart the grooves 14 and ridges 12 to the bottom surface of the crust 10. As the dough rises during the proofing stage, the parallel grooves 14 form around and adjacent to the exposed portions of the tubes 32 and the ridges 12 form by being allowed to extend in the spaces between the tubes 32. Parallel tubes 32 may either be coupled to cross member 34 by any of the manners described above (e.g., adhesive, welds, fasteners, etc.) or may be integrally formed with cross member 34. Protrusions 36 may be coupled to or integrally formed with parallel tubes 32 to stop the tubes 32 from contacting the plate 38 so that the crust 10 can have a thickness. Plate 38 opposes the parallel tubes 32 and forms the edge and recess 16 in the top surface of crust 10 as the crust 10 rises during proofing. At least one sidewall can also be included around plate 38 to support the dough thickness ultimately achieved. The sidewall or walls may be coupled to or integrally formed with an edge or edges of the plate 38 to form a pan or bowl or container shape.

Alternatively, a different mold may be used to form the crust 10 right side up. Such a mold may have an upper surface and a plurality of ridges extending upwardly from the upper surface. The ridges can be integral with the mold, or they can be separately coupled to vary the number of grooves imparted to the crust 10 by the mold.

In another aspect, an oven forming assembly for proofing and cooking corrugated dough crusts may be provided. An oven forming assembly for proofing and cooking corrugated dough crusts may include: an oven comprising a conveyor; and a forming assembly opposite the conveyor comprising a plurality of parallel cylinders and spaces in an alternating series. The forming assembly may be above the conveyor. The forming assembly may be moveable in a direction opposite that of the conveyor. The plurality of parallel cylinders may include a plurality of parallel tubes.

The oven forming assembly may further include at least one corrugated dough crust in between the at least one parallel cylinder and the at least one base. The at least one corrugated dough crust may include: a top surface in contact with the at least one base; and a bottom surface in contact with the at least one parallel cylinder, the bottom surface opposing the top surface. The bottom surface may define at least two parallel grooves separated by at least one parallel ridge, or at least two parallel ridges separated by at least one parallel groove, or at least one parallel ridge. The parallel grooves form adjacent the cylinders and the ridges extend in spaces between the cylinders.

Spacing between the parallel grooves may be about one inch to about one and three-quarters of an inch. The parallel grooves may extend about one quarter to about one half the way to the top surface of the crust.

Notwithstanding, turning to FIGS. 13-21 and for the exemplary purposes of this disclosure, oven forming assemblies 100 and 101 are shown for proofing and cooking corrugated dough crusts. Oven forming assemblies 100 and 101 are similar, the principal differences being the addition of an inline second oven 100 (the ovens 110 are in tandem, one behind the other) to elongate oven forming assembly 101 as may be required for certain applications. It should also be noted that oven forming assemblies 100 and 101 could be stacked upon each other, respectively, as well in certain applications, such as those requiring increased production within the same space footprint for example.

Each oven forming assembly 100 and 101 may provide for the proofing and cooking of pizza crusts for example. The crusts 10 shown in FIGS. 13-21 are formed upside down from dough pieces 9.

Since oven forming assemblies 100 and 101 are similar, they each generally include at least one oven 110, a conveyor 130, and a forming assembly 150.

Oven 110 may include a control panel 112, a machinery compartment and access panel 114, a window 116 that allows a user to see and access food products inside the baking chamber, a top cover 118 for covering the forming assembly 150, an infeed end 120, and a discharge end 122.

Infeed end 120 may include a framework 121 that supports the forming assembly 150 and the conveyor 130. Paneling 124 covers the framework 121, including a hinged end access panel 126 that allows access to the forming assembly 150 and the conveyor 130 at the infeed end.

Discharge end 122 may include a framework 123 that supports the forming assembly 150 and the conveyor 130. Paneling 124 covers the framework 123, including a hinged end access panel 126 that allows access to the forming assembly 150 and the conveyor 130 at the discharge end.

Conveyor drive motor housing 172 and forming assembly drive motor housing 170 are coupled to or integrally formed with discharge end 122. Frameworks 171 and 173 support the drive motors and related components that drive the conveyor 130 and the forming assembly 150. Paneling 124 covers the frameworks 171 and 173. A hinged side access panel 128 allows access to the forming assembly drive motor 174, chain 176, and the discharge end of forming assembly 150. A hinged side access panel 129 allows access to the conveyor drive motor 174, chain 176, and the discharge end of conveyor 130. Chains 176 are each a series of links pivotally joined together to form a medium for conveying or transmitting motion or power. Drive motors 174 are power transmission devices. Together, chains 176 and drive motors 174 and the other necessary structural, mechanical and electrical parts which provide the motive power for conveyor 130 and forming assembly 150 (including sprockets, guards, mounting bases and hardware) make drive assemblies. In this case, the drive assemblies are side mounted drive assemblies that are mounted to the sides of the conveyor 130 and the forming assembly 150.

Conveyor 130 moves the dough pieces and cooked, proofed dough crusts through oven 110. Conveyor 110 may be any suitable conveyor or combination of conveyor types. For example, conveyor 130 may be a chain conveyor in which one or more chains act as the conveying element, a power conveyor which requires power to move its load, and/or a chain roller conveyor in which tread rollers have attached sprockets which are driven by a chain.

Conveyor 130 may include a conveyor frame 132 and frame or bed spacers (cross members) as necessary to maintain frame rail spacing. Conveyor 130 also may include a bed or conveying surface 138 (a working surface of the conveyor 130 upon which the load is located while being conveyed) between the conveyor frame 132. A middle section of conveyor 130 not containing the drive or tail assemblies is the intermediate bed which is located inside oven 110. A discharge end bed section is the location at which cooked, proofed dough crusts 110 are removed from the conveyor 130. An infeed bed end section is the end of the conveyor 130 nearest the loading point.

A shaft 134 (e.g., a bar usually of steel, to support rotating parts or to transmit power) is located at the infeed end of bed 138. An adjustable drive sprocket and tension shaft 136 is located at the discharge end of bed 138. Adjustable drive sprocket and tension shaft 136 is coupled to conveyor drive motor 174 by chain 176.

Forming assembly 150 may be located above conveyor 130 and may move in an opposite direction as conveyor 130. Forming assembly 150 has the assembly of the necessary structural and mechanical parts which provide the means to adjust the length of forming assembly and chains to compensate for stretch, shrinkage or wear and to maintain proper tension of forming assembly 150. Thus, forming assembly 150 is supported by adjustable drive sprocket and tension shaft and bushing assembly 151, adjustable sprocket and tension shaft and bushing assembly 152, and support sprocket shaft and bushing assemblies 154.

A pair of elongate chains 152 is located on the sprocket ends of adjustable drive sprocket and tension shaft and bushing assembly 151, adjustable sprocket and tension shaft and bushing assembly 152, and support sprocket shaft and bushing assemblies 154. Chains 152 slide against and/or ride along a pair of spaced apart, parallel tracks 154 mounted atop oven 110. Tracks 152 may be angled tracks with flat portions mounted to oven 110 and orthogonal vertical portions supporting cylinder assemblies 160 and chains 152. Chains 152 ride to the outside of the orthogonal vertical portions of the tracks 154, thereby keeping chains 152 running consistently parallel to one another, etc., which in turn keeps cylinder assemblies running consistently orthogonal to the tracks 154 and the conveyor 130.

Cylinder assemblies 162 each comprise a cylinder 162 and an attachment plate 164 located at each end of cylinder 162. Parallel cylinders 162 may either be coupled to plates 164 by any of the manners described above (e.g., adhesive, welds, fasteners, etc.) or may be integrally formed with plates 164. Cylinder 162 may be a solid rod or a hollow tube as shown.

Each attachment plate has a slot 166 through its free distal end to facilitate the adjustable coupling of cylinder assemblies 160 to chains 152. Bolts 156 and nuts 158 may be used to removably couple cylinder assemblies 160 to chains 152. Nuts 158 may be coupled to (e.g., by a tack weld or adhesive) to the sides of links of chains 152. Bolts 156 may then be inserted through slots 166 of plates 164 and adjusted to appropriate positions and then coupled to nuts 158. Thus, parallel cylinders 162 can be separated by parallel spaces. Parallel cylinders 162 and the parallel spaces are used to impart the grooves 14 and ridges 12 to the bottom surfaces of crusts 10.

Thus, describing the operation of oven forming assemblies 100 and 101 further and referring to FIGS. 13-14 and 20-21 specifically, proofing and cooking corrugated dough crusts10 such as pizza dough crusts may be as follows.

Figures 20, 21:
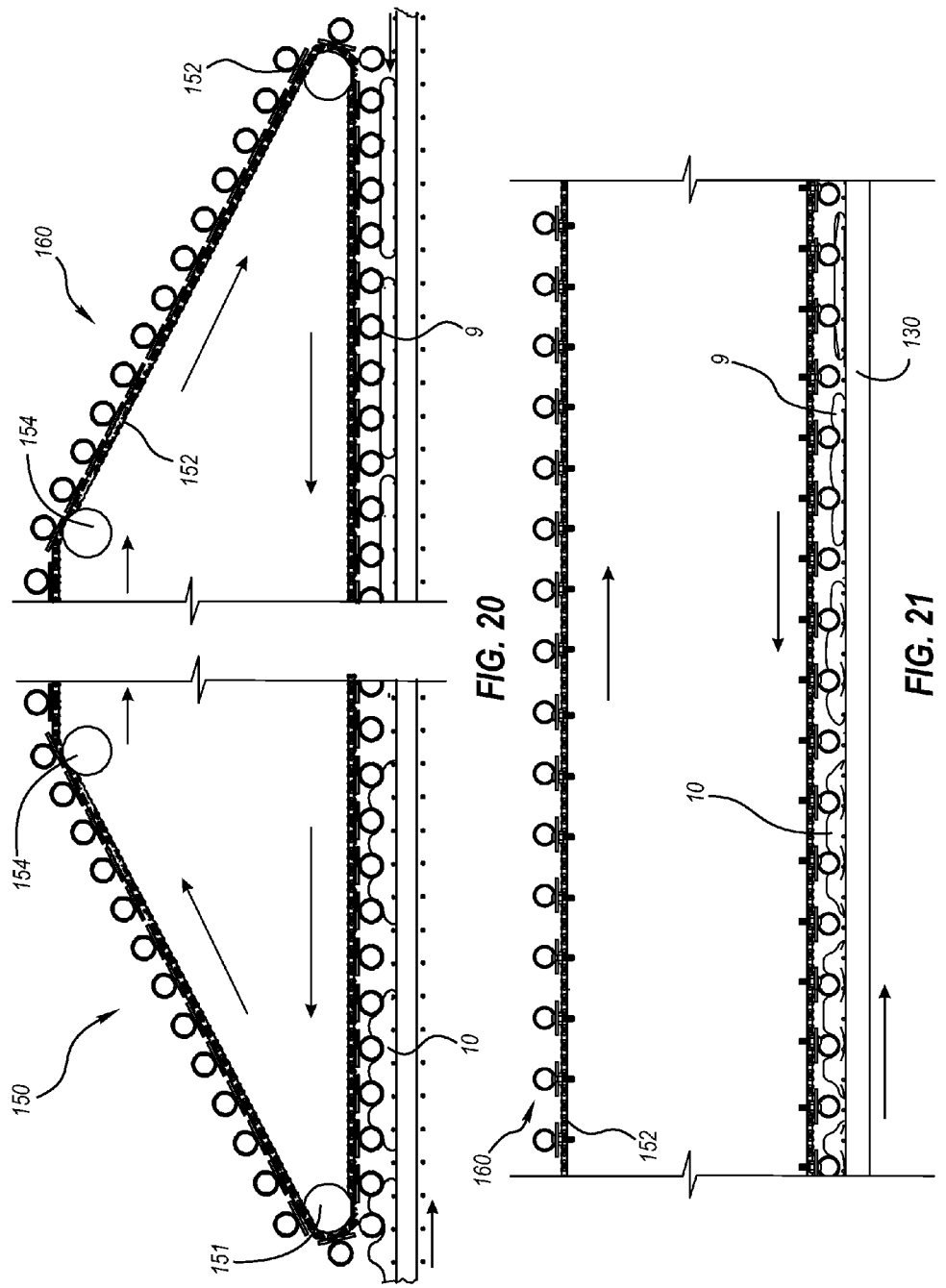
FIG. 20 is an operational, broken away, side view of the end portions of the forming system of the oven forming assembly of FIG. 13 or FIG. 15.
FIG. 21 is another operational, broken away, side view of the central portion of the forming system of the oven forming assembly of FIG. 13 or FIG. 15.

FIGS. 20 and 21 show the flow or the direction of travel of dough pieces 9 and cooked, proofed dough crusts 10 on conveyor 130 while under forming assembly 150. Forming assembly 150 is above conveyor 130 and moves in the opposite direction of conveyor 130.

A top surface of at least one dough piece 9 may be positioned in contact with the conveyor 130 at an infeed end of the conveyor 130 and an opposing bottom surface of the at least one dough piece 9 may be in contact with at least one parallel cylinder 162 of an opposing forming assembly 150 including a plurality of parallel cylinders 162 and spaces in an alternating series.

The at least one dough piece 9 may be moved on the conveyor 130 under the opposing forming assembly 150 into an oven 110 proofing the dough piece 9 to form therefrom at least one proofed dough piece. As the dough rises during this proofing stage, the parallel grooves 14 form around and adjacent to the exposed portions of the tubes 162 and the ridges 12 form by being allowed to extend in the spaces between the tubes 162.

The at least one proofed dough piece on the conveyor 130 under the opposing forming assembly 150 may continue to be moved through the oven 110 at least partially baking and setting the proofed dough piece to form therefrom at least one cooked, proofed dough crust 10. Therefore, the at least one cooked, proofed dough crust 10 may have a bottom surface defining one of: at least two parallel grooves 14 formed adjacent the at least one parallel cylinder 162 separated by at least one parallel ridge 12 extending in a space adjacent the at least one parallel cylinder 162; at least two parallel ridges 12 extending in spaces adjacent the at least one parallel cylinder 162 separated by at least one parallel groove 14 formed adjacent the at least one parallel cylinder 162; and at least one parallel ridge 12 extending in a space adjacent the at least one parallel cylinder 162.

The at least one cooked, proofed dough crust 10 may be removed from a discharge end of the conveyor 130.

Use

Implementations of oven forming assembly implementations for proofing and cooking corrugated dough crusts, roller grill retaining system implementations, and/or crust roller grill system implementations are particularly useful in pizza applications as previously explained. However, implementations are not limited to uses relating to pizzas. Rather, any description relating to pizza applications is for the exemplary purposes of this disclosure, and implementations may also be used in a variety of other food applications with similar results, such as with pastries, pies, hamburgers, sandwiches, tortas, tostadas, foccacia, flat bread, or any other food items with normally substantially flat crusts.

In places where the description above refers to particular implementations, it should be readily apparent that a number of modifications may be made without departing from the spirit thereof and that these implementations may be alternatively applied. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:

1. A system for proofing and cooking corrugated dough crusts comprising:
   a forming assembly comprising at least one parallel cylinder separated by at least one parallel space; and
   at least one base opposing the at least one parallel cylinder, wherein the bases are moveable and comprise:
      an infeed end configured to intake one or more dough pieces,
      an intermediate bed disposed next to the infeed end, comprising a side facing the at least one parallel cylinder, and configured to be disposed inside an oven, wherein the intermediate bed and the at least one parallel cylinder form the dough pieces into the corrugated dough crusts, and
      a discharge end disposed next to the intermediate bed and configured to discharge the corrugated dough crusts.

2. The system of claim 1 wherein the at least one base is a conveyor.

3. The system of claim 2 wherein the forming assembly comprises a plurality of parallel cylinders and spaces in an alternating series, and wherein the forming assembly is moveable in a direction opposite that of the conveyor.

4. The system of claim 3 wherein the plurality of parallel cylinders comprise a plurality of parallel tubes.

5. The system of claim 1 wherein the at least one parallel cylinder comprises at least one parallel tube.

6. The system of claim 1 further comprising at least one corrugated dough crust in between the at least one parallel cylinder and the at least one base comprising:
   a top surface in contact with the at least one base; and
   a bottom surface in contact with the at least one parallel cylinder, the bottom surface opposing the top surface and defining one of:
      at least two parallel grooves formed adjacent the at least one parallel cylinder separated by at least one parallel ridge extending in a space adjacent the at least one parallel cylinder;
      at least two parallel ridges extending in spaces adjacent the at least one parallel cylinder separated by at least one parallel groove formed adjacent the at least one parallel cylinder; and
      at least one parallel ridge extending in a space adjacent the at least one parallel cylinder.

7. The system of claim 6 wherein spacing between the parallel grooves is about one inch to about one and three-quarters of an inch.

8. The system of claim 6 wherein the parallel grooves extend about one quarter to about one half the way to the top surface of the crust.

9. An oven forming assembly for proofing and cooking corrugated dough crusts comprising:
   an oven comprising a conveyor, wherein at least a portion of the conveyor is disposed inside the oven; and
   a forming assembly opposite the conveyor comprising a plurality of parallel cylinders and spaces in an alternating series, wherein at least a portion of the forming assembly is disposed inside the oven.

10. The oven forming assembly of claim 9 wherein the forming assembly is above the conveyor.

11. The oven forming assembly of claim 10 wherein the forming assembly is moveable in a direction opposite that of the conveyor.

12. The oven forming assembly of claim 9 wherein the forming assembly is moveable in a direction opposite that of the conveyor.

13. The oven forming assembly of claim 9 wherein the plurality of parallel cylinders comprise a plurality of parallel tubes.

14. The oven forming assembly of claim 9 further comprising at least one corrugated dough crust in between at least one parallel cylinder and the conveyor comprising:
   a top surface in contact with the conveyor; and
   a bottom surface in contact with the at least one parallel cylinder, the bottom surface opposing the top surface and defining one of:
      at least two parallel grooves formed adjacent the at least one parallel cylinder separated by at least one parallel ridge extending in a space adjacent the at least one parallel cylinder;
      at least two parallel ridges extending in spaces adjacent the at least one parallel cylinder separated by at least one parallel groove formed adjacent the at least one parallel cylinder; and
      at least one parallel ridge extending in a space adjacent the at least one parallel cylinder.

* * * * *